United States Patent [19]

Russell, Jr.

[11] Patent Number: 4,466,071
[45] Date of Patent: Aug. 14, 1984

[54] HIGH IMPEDANCE FAULT DETECTION APPARATUS AND METHOD

[75] Inventor: B. Don Russell, Jr., Bryan, Tex.

[73] Assignee: Texas A&M University System, College Station, Tex.

[21] Appl. No.: 306,304

[22] Filed: Sep. 28, 1981

[51] Int. Cl.³ .......................................... G01R 31/02
[52] U.S. Cl. .................................... 364/492; 324/51;
361/44; 361/83; 361/89; 364/481; 364/482; 364/483
[58] Field of Search ............... 364/481, 482, 483, 492, 364/484; 361/44, 45, 46, 83, 1, 86, 87, 88, 89, 113; 324/51, 52

[56] References Cited

U.S. PATENT DOCUMENTS

| 3,295,022 | 12/1966 | Schelisch | 361/113 |
| 3,515,943 | 6/1970 | Warrington | 317/27 |
| 4,261,038 | 4/1981 | Johns et al. | 364/551 |
| 4,297,738 | 10/1981 | Lee | 361/42 |
| 4,313,146 | 1/1982 | Lee | 361/113 |

OTHER PUBLICATIONS

Mann, B. J., "Real Time Computer Calculation of the Impedance of a Faulted Single-Phase Line," Electrical Engineering Transactions, The Institution of Engineers, Australia, vol. #5, No. 1, Mar. 1969, p. 27.
Udo, Tatsuo & Kawai, Mikio, "Fault Generated Noise Voltage in a Transmission Line," IEEE Transactions on Power Apparatus and Systems, vol. PAS-86, Jun. 1967, p. 681.
IEEE Power System Relaying Committee Report, "The Interruption of Downed Conductors on Low Voltage Distribution Systems," Oct. 1976.
Beasley, William L., "An Investigation of the Radiated Signals Produced by Small Sparks on Power Lines," Ph.D. Dissertation, Texas A&M University, Jan. 1970, pp. 6-7.
Warrington, A. R. van C., "Protective Relays, Their Theory and Practice", vol. 2, Chapman and Hall, London, 1969, p. 341.

Primary Examiner—Errol A. Krass
Assistant Examiner—Clifford L. Tager
Attorney, Agent, or Firm—Arnold, White & Durkee

[57] ABSTRACT

Apparatus is provided for detecting the presence of a high impedance arcing fault on an electrical circuit, particularly a high voltage power line. Detection of a high impedance fault is realized by monitoring the high frequency components of the alternating current in the circuit, and evaluating the high frequency components of each cycle of the alternating current using a microcomputer operating in accordance with a program of instructions, to determine the occurrence of a significant increase in magnitude of the high frequency components, and then to determine whether the increase exists for a prescribed period of time and follows a prescribed pattern. The high frequency components are monitored using a current-to-voltage transducer coupled to the electrical circuit, bandpass filters coupled to the transducer, and an analog-to-digital converter providing digitized samples of the filtered transducer output voltage signal.

18 Claims, 9 Drawing Figures

HIGH IMPEDANCE FAULT DETECTION APPARATUS AND METHOD

BACKGROUND OF THE INVENTION

The present invention relates to electrical fault detection; and more particularly, it relates to the detection of high impedance faults.

High impedance faults are characterized by a high impedance at the point of fault. Accordingly, a high impedance fault typically produces a small fault current level. High impedance faults can, therefore, be generally defined as those faults which do not draw sufficient fault current to be recognized and cleared by conventional overcurrent devices.

High impedance faults may result from a number of circumstances. For example, occurrences giving rise to a high impedance fault include: a tree brushing against a conductor, a broken conductor falling to the ground, contact between a conductor and a pole crossarm, and dirt accumulation on an insulator. In such occurrences, the fault current path is not clearly established, and a "bolted" fault may be delayed or may not occur at all. However, arcing commonly exists.

Clearly, high impedance faults present serious hazards.

High impedance faults are found to typically occur on electric power lines at distribution level voltages. Most utility customers in North America receive service from four-wire solidly grounded distribution feeders. The nominal phase to phase voltage on these circuits ranges from 4160 v to 13,800 v, with many operating at 12,470 v. Other distribution circuits operate at higher voltages, notably 24,900 and 34,500 v; these feeders, however, are less subject to the high impedance fault problem due mainly to their higher voltage level.

Distribution line fault clearing is commonly performed by an overcurrent sensing device such as an overcurrent relay/circuit breaker combination, a recloser or a fuse. While these devices must interrupt fault currents, they must also carry normal and emergency load currents as well as transient overcurrents caused by inrush or load pickup surges. These operating requirements suggest a tradeoff in choosing the level of current at which a device will operate. Overcurrent devices are usually set so that the lowest pickup value for operation is 150-200% of the maximum load seen by that device. This setting assures that in the case of high current faults, the feeder will be protected from burndown while eliminating most unnecessary service interruption.

Ground relaying is used on many electric power distribution systems. Some practioners in the field believe that ground fault relaying may help indicate a high impedance fault in such systems. Since high impedance faults commonly involve a current path to ground, one indication of a fault would be an increased earth return current. In practice this proposed solution is unworkable since the sensitivity of commonly used unground relays cannot be set to detect most high impedance faults without increased risk of false indication of tripping. Furthermore, for certain utility companies who use multiple grounded systems, where earth return takes many different paths, not necessarily the return path being monitored for relaying, monitoring of earth return current to detect a high impedance fault does not work well. Also, the policy of many utility companies is to allow a certain unbalance in three phase loads (in some cases 50-75% unbalance). This produces a large "normal" neutral or earth return current and means that ground relays must be desensitized so that little advantage is obtained in detecting low-grade faults.

The relay engineer is, therefore, faced with the dilemma of setting trip levels on phase and ground relays low enough to clear some high impedance faults yet high enough to stay in service for load unbalance or inrush currents. It is usually a matter of company policy whether to use high settings and allow high impedance faults to occur, or to employ low settings and accept a higher degree of "nuisance" trips.

In many cases a fault will draw enough current to cause an overcurrent device to operate and the fault will be cleared. But if the impedance at the point of the fault is high, current may increase only a few percent above load current. The fault persists indefinitely because it is not recognized as a fault.

As a result of the inadequacies of conventional overcurrent protection schemes in clearing high impedance faults, there is substantial need for new apparatus and methods for clearing such faults.

SUMMARY OF THE INVENTION

In accordance with the present invention, apparatus is provided for detecting a high impedance fault in an electrical circuit having electrical current flowing therein. In particular, the present invention provides for detection of a high impedance fault on an electric power line. However, the apparatus may also be readily used to detect a high impedance fault in other types of electrical circuits, such as electric motors, switch gear, transformers, cables, etc. Also, while common usage of the fault detection method and apparatus of the present invention will be on alternating current electrical circuits, use on a direct current electrical circuit is within the scope and teachings of the invention.

High impedance fault detection in accordance with the present invention is by evaluation of the waveform of the current flow through the electrical circuit. Specifically, the high frequency components of the current are evaluated for an increase in amplitude above normal operating levels. In the context of the present invention, "high frequency components" refers to signal of 1000 Hz and above.

In monitoring the electrical circuit current, an evaluation is first made for an "event" in the circuit, i.e., an occurrence which produces an increase in the high frequency components of the current. After an event is detected, an evaluation is made to determine the time duration over which the increase in high frequency components remains. A fault detection is determined when the increase in magnitude of the high frequency components remains for a described period of time. Suitably, for an A-C circuit, the evaluation is based upon the number of cycles of the alternating current within a prescribed time interval in which the high frequency components remain above a predetermined level; and for a D-C circuit, the evaluation is based on a prescribed amount of time within a prescribed time interval in which the high frequency components remain above a predetermined level.

To monitor the electrical circuit current for an increase in the amplitudes of the high frequency components, a transducer is coupled to the electrical circuit to produce a voltage signal representative of the waveform of the alternating current flowing in the circuit.

The voltage signal is filtered by a high pass filter to substantially remove all frequency components below a prescribed frequency, for example, 2 kHz. The filtered voltage signal is sampled a plurality of times during each cycle of the alternating current, with each sample being converted by an analog-to-digital converter into a digital data word. Evaluation of the digital data, which is representative of the magnitude of the high frequency components of the alternating current at series of points in a cycle, is by a microcomputer system including a central processing unit and interconnected memory.

A set of program instructions are stored in the memory for causing the central processing unit to perform prescribed computations using the digital data. In particular, the central processing unit performs computations to detect a predetermined increase in level of the high frequency components above an "adaptive threshold", and thereafter evaluate the time duration over which the high frequency components exhibit at least the predetermined increase in level. As used herein, "adaptive threshold" refers to a floating threshold, as opposed to a specific or fixed absolute threshold, which varies as system load conditions, etc., change.

In accordance with a preferred set of program instructions for directing the central processing unit in evaluating the digital data, an energy level for a present cycle of the alternating current in the electrical circuit is computed, and the computed energy level is compared to an average energy level. If the computed energy level for the present cycle exceeds the average energy level by a predetermined amount, a count is then made of the number of cycles within a prescribed time interval in which the computed energy level exceeds by the predetermined amount the average energy level.

The apparatus suitably further includes a circuit breaker interface coupled to the central processing unit, for producing a circuit breaker trip signal in response to a fault detection output by the central processing unit. Also, in accordance with common relay practice, a "target" or "flag" can be set to indicate that a fault has occurred.

The apparatus may further include a display coupled to the central processing unit for indicating the number of faults detected since a defined operating start point. Also, a separate display may be coupled to the central processing unit to indicate the number of events detected since a defined operating start point.

To provide for communication of data from the central processing unit to peripheral devices, a serial interface may be coupled to the central processing unit.

BRIEF DESCRIPTION OF THE DRAWINGS

A written description setting forth the best mode presently known for carrying out the present invention, and of the manner of implementing and using it, is provided by the following detailed description of a preferred embodiment which is illustrated in the attached drawings wherein.

DETAILED DESCRIPTION OF AN ILLUSTRATIVE EMBODIMENT

A. High Impedance Fault Detection Scheme

Figure 1:
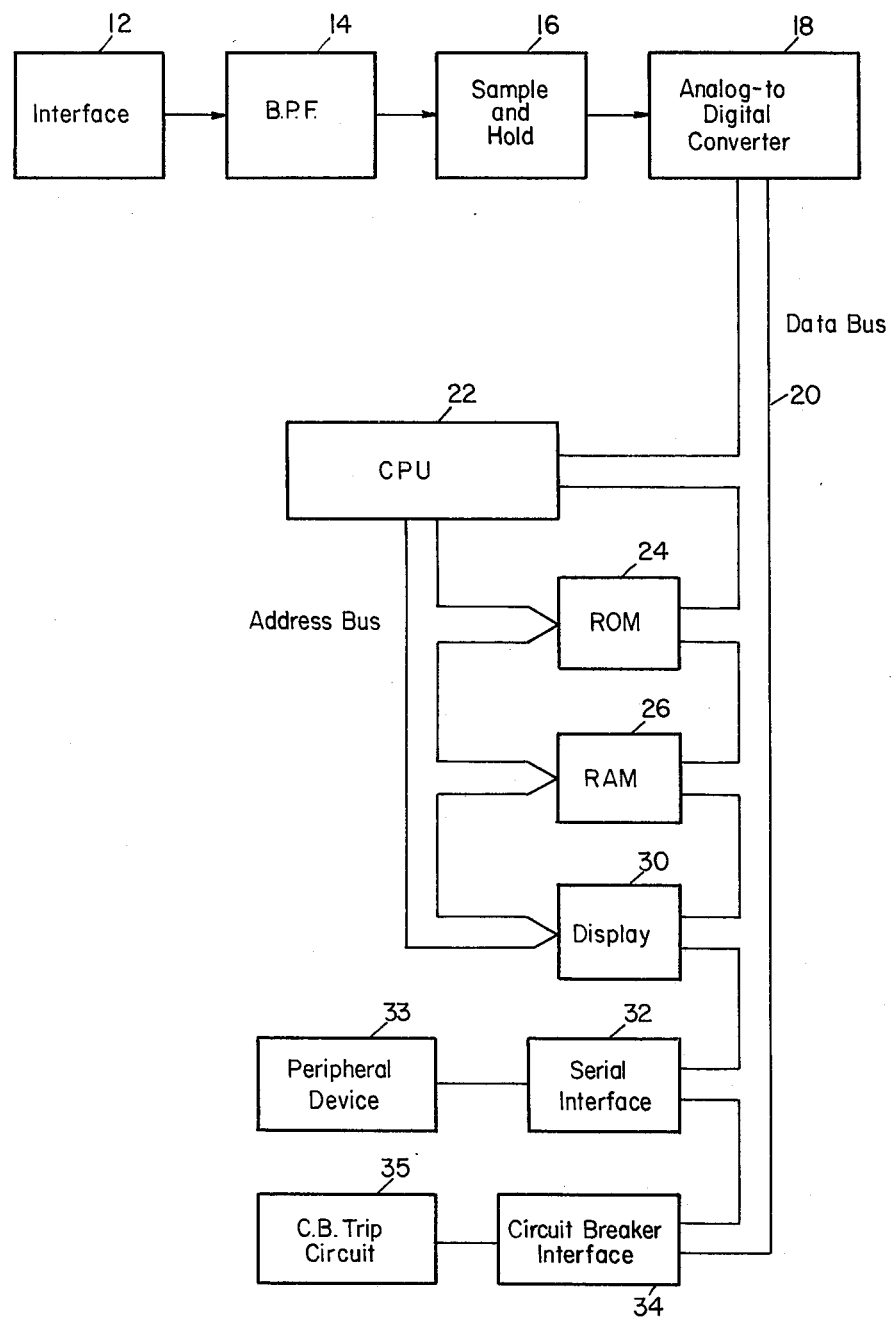
FIG. 1 is a block diagram of apparatus in accordance with the present invention for performing high impedance fault detection.

High impedance faults are typically characterized by arcing. Arcing behavior is exhibited between two conductors separated by a small gap and having a potential difference between them. At some potential difference value, the resistance of the material in the gap (typically air) decreases significantly and current flows between the two conductors. This is referred to as the "breakdown" point.

Breakdown begins with one or more free electrons in the gap space between the conductors being accelerated by the electric field established by the potential difference. As the electrons accelerate, their kinetic energy increases. Upon collision with gas molecules, electrons having sufficient energy ionize the molecules, thereby freeing additional electrons in the gap. This rapid ionization process, called avalanche, provides for a sudden ability of the air in the gap to conduct electrical current. Once avalanche occurs, conduction may continue in a continuous discharge called an arc. A stable arc is not immediately formed in most instances. But, rather, several strikes and restrikes occur during a short period of time until a stable arc is established. These momentary breakdowns are called sparks. In an AC system, stable arcs will typically form and be extinguished every half cycle. Just before the formation and just after the extinction of a stable arc, several sparks of short duration form and extinguish.

It has been found that high impedance faults generally do not offer conditions conducive to the formation of a steady arc. Arcing associated with a high impedance fault tends to be random and transient in nature. That is, the arc extinguishes and immediately restrikes.

For a 60 Hz AC spark gap, as the applied voltage reaches the breakdown or restrike voltage, the voltage across the arc drops to $e_{arc}$ and remains constant as long as current flows. When current flow returns to zero, the voltage increases in the opposite polarity direction, and the arc may restrike in the opposite direction. The instantaneous resistance of an arc varies significantly between points of zero current flow; the value of resistance is very large near a current zero and reaches a small minimum value at the current peaks. The arc resistance also varies directly with the length of the arc.

Because resistance is non-linear, the sinusoidal waveshape of the arc voltage or current will be distorted. The resulting waveshapes depend on the type of circuit involved, the particular characteristics of the arc, and the presence of harmonics in the supply voltage. It has also been shown that arcs are predominately resistive in nature (unity power factor), although the apparent power factor for low current arcs varies from unity to 0.75 from the start to the extinction of the arc.

At transmission and sub-transmission level voltages, the high impedance fault problem is virtually non-existent for the reason that the average voltage gradients at peak current for 60 cycle arcs in air are relatively constant over the entire range from 100 to over 20,000 peak amperes. For an arc current of between 100 and 800 amps, the voltage gradient of the arc is practically independent of current magnitude. If an arc is considered as a series resistance with an effective resistance equal to:

$$R_{arc\;eff} = \frac{\text{arc voltage gradient} \times \text{length of arc}}{\text{rms short circuit amperes}}$$

then the effective resistance can also be considered constant throughout the range of source voltages for a given short circuit current. An arc will, therefore, reduce the current considerably for a low source voltage, yet have little effect in reducing the short circuit current at higher voltages, since in the latter case the arc voltage is a much smaller percentage of the applied voltage. For this reason, arcing at transmission level voltages produces fault current values very near those produced by bolted faults. The current limiting effect of arcs is one of the reasons high impedance faults cannot normally be identified by overcurrent devices.

The frequency domain characteristics of high impedance faults indicate a random and transient nature. Although a precise frequency spectrum of an arc is difficult to obtain, Fourier analysis provides for an approximation of the frequency spectrum of an arcing fault.

The two cases to be considered are a gate function and a train of periodic gate functions. These functions can help to represent an arcing fault since the arcs produce spikes of short duration such as a short gate function. Yet an arc will probably not produce a singular impulse nor will it produce periodic impulses. The unit gate function and its Fourier transform indicated that arcing faults can be expected to exhibit a wideband frequency response.

For a gate function with unity magnitude of duration $T = 4$ msec (roughly the duration of a power arc), as an example, the Fourier transform is:

$$F(\omega) = T\left(\frac{\sin\left(\frac{\omega T}{2}\right)}{\frac{\omega T}{2}}\right)$$

Applying this transform to determine amplitudes of its frequency components for various values of frequency; the following is obtained:

| f(Hz) | amplitude | relative amplitude (compared to 0 Hz) |
|---|---|---|
| 0 | $2 \times 10^{-3}$ | 1 |
| 2625 | $1.212 \times 10^{-4}$ | .0606 |
| 9625 | $3.31 \times 10^{-5}$ | .0166 |

If $T = 1 \times 10^{-4}$ sec $= 0.1$ msec (a time which would correspond to sub-cycle sparking), the following is obtained:

| f(Hz) | amplitude | relative amplitude |
|---|---|---|
| 0 | $2 \times 10^{-4}$ | 1 |
| 5000 | $6.36 \times 10^{-5}$ | .318 |
| 15000 | $2.21 \times 10^{-5}$ | .106 |

Each frequency corresponds to the peak of a lobe of the $(\sin x/X)$ function. These numbers indicate, as would be expected, that there are significant number of frequency components at the higher frequencies, and that the higher frequency components have a larger relative magnitude for the sub-cyle sparks than for the power arcs. The conclusion is that arcing associated with high impedance faults generates essentially wideband noise characteristics. However, the amplitudes of frequencies near 10 kHz may be 50 dB or more down from the signal measured at 60 Hz.

The switching transients associated with the normal operation of power systems may also exhibit wideband frequency characteristics due to the presence of arcs drawn in switchgear and also the system response to a new electrical configuration. However, high frequency transients caused by switching are intermittent and time-limited, whereas high frequency transients caused by high impedance fault arcing would be recurrent and continue over the time of the arc.

In view of the characteristic increase in high frequency current components exhibited by high impedance faults, evaluation of the waveform of current through an electrical circuit for high frequency components is used for high impedance fault detection. However, because switching events in an electrical circuit generate similar transients, the evaluation must distinguish between faults and normal circuit operation. Accordingly, fault detection involves event detection and event identification.

The detection scheme involves monitoring electrical circuit current for an increase in the amplitudes of the high frequency components. As used in connection with the fault detection scheme of the present invention, "high frequency components" refers to signals of 1000 Hz and above. After sensing an "event" in the circuit, i.e., an occurrence which produces an increase in the high frequency components, evaluation of the high frequency components is made to determine the time duration over which the increase remains. If the increase in magnitude of the high frequency components remains, either continuously or intermittently, a fault event is indicated. If the increase in magnitude of the high frequency components is discontinued immediately, a switching event is indicated.

Event detection in accordance with a preferred manner of current waveform evaluation involves a determination of the average level of the high frequency components over a period of time. Over each cycle, the present magnitude of the high frequency components is determined and compared to the average level. If the comparison shows the present magnitude to be sufficiently greater, an event has occurred. If the comparison shows a present magnitude reasonably equal to the time average, the average level is updated and event detection is begun again. This evaluation procedure is particularly advantageous in that it is "adaptive" to changes in the normal operating condition of a circuit. For example, in the event of a change in the load on a circuit, which produces a different normal noise level, event detection will proceed with an automatic determination of a new average level for the high frequency components of the current waveform. In this sense, the detection scheme is "adaptive".

Event identification in accordance with a preferred manner of current waveform evaluation involves a determination of the amount of time, either continuously or intermittently, that the magnitude level of the high frequency components which triggered an event detection remain high after the onset of an event. If the number of cycles during which an event "exists" exceeds a predetermined reference time period, a fault is indicated. For example, if 32 or more of 255 cycles following an event detection have a high frequency magnitude level at least 50% greater than the preevent average high frequency magnitude level, the event is considered to have "existed" for a sufficient period of time to indicate a fault. If less than 32 cycles had a sufficiently high frequency components magnitude to trigger an event detection, normal operation on the circuit is indicated.

Although event detection based on a 50% greater high frequency magnitude level is believed to be suitable for most circuits on which the present invention is used, the chosen level of increase to indicate a fault detection is variable and constitutes a parameter to be set at the discretion of the user. In practice, the level set will probably be in the range of a 30% to 70% increase. The lower limit of the range will be a compromise on any given system between the desire to detect very low grade faults and the need to maintain reliable operation of the system without false trips.

The number of event-existing cycles to indicate a fault is also a variable parameter for choice. Again, a compromise must be made between correct identification of very low grade faults and the possibility of falsely identifying a long switching event as a fault.

The parameter of time interval after an event detection to evaluate high frequency noise and make the trip/no trip decision is also a matter of choice. The period of time chosen is not critical, but is of concern when the fault detection is actually used to trip a feeder. Then, the time period chosen must coordinate with the overcurrent devices on the feeder. It is believed to be better to allow downstream devices to clear a fault; therefore, the time period for the high impedance fault detection should be chosen with the time-current characteristics of the downstream fuses in mind.

B. Fault Detection System

1. General System Block Diagram

Referring to FIG. 1, a block diagram of preferred apparatus for performing high impedance fault detection in accordance with the detection scheme of the present invention is presented. The apparatus is particularly suited for detecting faults on electric power line.

In order to obtain information regarding events on a power line, means is included for producing an indication of the electrical current waveform on the power line. Suitably, interforce 12 includes a transducer producing an electrical signal functionally related to the current through the power line may be used. The transducer, however, must be one which is responsive to the frequencies of interest. Preferably, the transducer is a current transformer. These transducers are already used for overcurrent protection on all distribution feeders. Although current transformers may attenuate or distort signals at the higher frequencies (i.e. above 1000 Hz), since a reconstruction of the power line current waveform is not required, but only an identification of relative changes in magnitude, current transformers are adequate.

The current in the current transformer secondary must be converted to a voltage signal input. Shunts may be used as long as there is not an excessive burden to the current transformers. However, a low value of shunt resistance gives a correspondingly low value of signal input voltage. It is believed to be better to use a current to voltage transformer, or to use an additional current transformer in the relaying current transformer secondary, with the additional current transformer having a shunt in its secondary. It is desirable to maintain the current-to-voltage conversion ratio as near unity as possible to keep signal levels high.

A single input signal derived from a summation of currents is sufficient for fault detection. The interface is formed by inserting the three phase current transformer secondaries through the primary of a current to voltage transformer. The voltage output is proportional to the sum of the three phase currents. An alternate interface would be the use of three current-to-voltage transformers placed around the three secondary circuits. This would produce three inputs, one per phase, to the detection apparatus.

The signal input from transducer 12 is primarily a 60 Hz signal with some harmonics and high frequency components about 60 dB below the fundamental. Because high frequency components for evaluation are desired at a nominal level of −5 to +5 volts during arcing conditions, and at a much smaller level during the non-faulted conditions, sufficient amplification must be provided to bring the high frequency components to a usable range. Also, there must be a filtering of 60 Hz and the low harmonics.

Signal conditioning is provided by band pass filter 14. Suitably, the signal input is fed through a 60 Hz reject filter and through three stages of high pass filters with a 2 kHz corner frequency. The roll-off below 2 kHz is 60 dB per decade, effectively eliminating the effects of the power line current fundamental and low-order harmonics. The resulting signal is run through three stages of amplification to provide the desired 60 dB gain at the high frequencies. Finally, two stages of low-pass filtering with a 10 kHz corner frequency reduce any digitally-generated noise from injection on the analog signal.

The output of the filter 14 is applied to a sample and hold circuit 16. A voltage level captured by the sample and hold circuit is then applied to analog-to-digital converter 18 (A/D). Conversion accuracy is not critical, and an eight-bit A/D may be used.

The objective is to sample the filter output signal as often as possible to catch very short duration noise spikes. The A/D sample rate is limited by program execution time. A sample rate of about 10 kHz is about the maximum given program overhead. Since the analog signal contains components at these frequencies, it is understood that the data will be undersampled. However, energy calculations made on undersampled data are valid, especially considering the fact that fault detection decisions are made only on relative changes in energy. Furthermore, undersampling is valid since an attempt is not being made to digitally reconstruct the filter output signal.

Digital data is available from A/D 18 on data buss 20 to be addressed by the central processing unit (CPU) 22 for use in fault detection calculations. Any general purpose microcomputer system is suitable for implementation of the fault detection scheme. The microcomputer system, in addition to CPU 22, also includes ROM 24 and RAM 26. A display 30 is also provided for providing a readout of certain calculated values.

The fault detection apparatus may further include a serial interface 32 connected to data buss 20, for transferring data to and from peripheral device 33, which may be a terminal, modems, or the like.

Finally, a circuit breaker interface 34 is provided. In response to an output code from CPU 22, interface 34 develops the necessary trip signal for actuating a circuit breaker trip circuit 35 to clear a fault.

2. Fault Detection Algorithm

Figure 2:
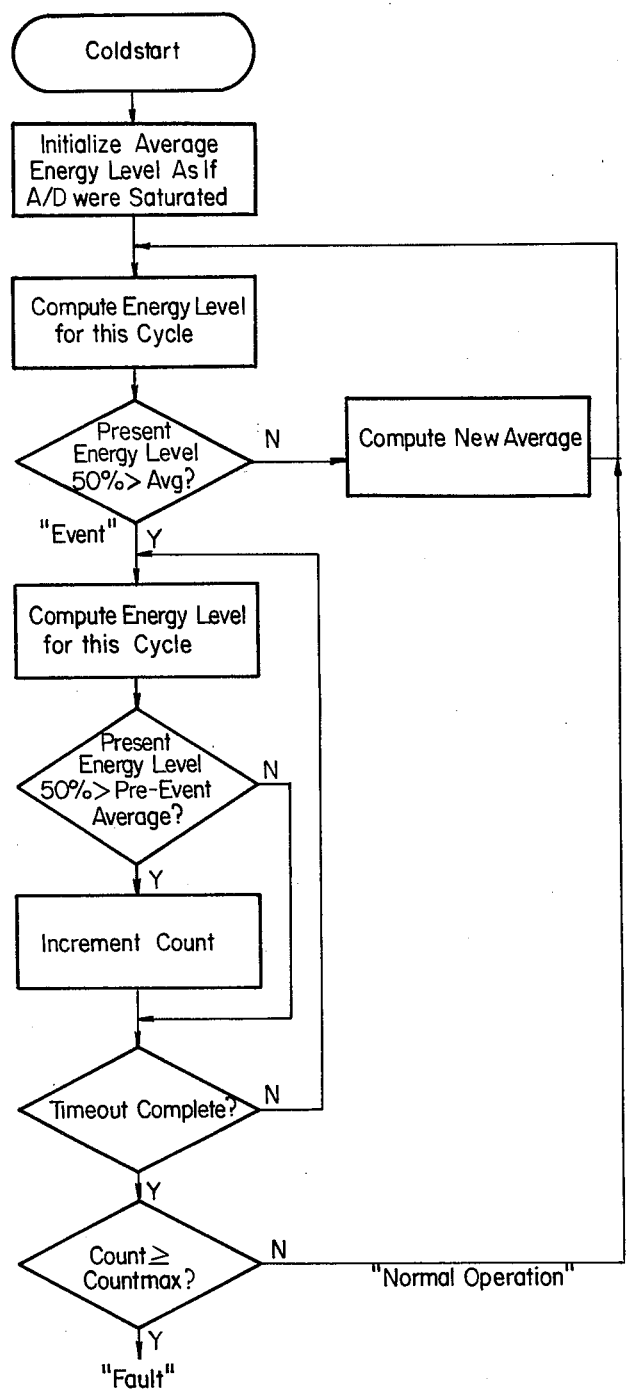
FIG. 2 is a flowchart of detection algorithm executed by the CPU in FIG. 1 to determine the existence of a fault.

Operation of the microcomputer system is in accordance with the program instruction set, or algorithm, flowcharted in FIG. 2. The program includes two routines. One routine is an event detection routine, the purpose of which is to identify some occurrence on the feeder. Once an event has been detected, the event identification routine determines the nature of the event. If the event is identified as a normal system occurrence, the event detection routine will once again be entered. If, however, the event is identified as a fault, an alarm or command to trip is issued.

Upon initial start-up of the fault detection apparatus, a "cold start", the algorithm assumes that the noise average for a predetermined time period, suitably one second, previous to cold start was the maximum possible value that could be registered by the data acquisition portion of the fault detection apparatus. Thus, as indicated in the flowchart of FIG. 2, an initial average high frequency energy level value is set in the computer as if the analog-to-digital converter were saturated. During the succeeding time period of one second, the algorithm adapts to the actual noise level on the feeder by computing the energy level.

In the main portion of the event detection routine, the energy level for each 60 Hz cycle is computed. This involves the summation of high frequency raw data samples over an entire 60 Hz cycle. Suitably, a 60 Hz cycle is sampled approximately 128 times. The summation yields a number proportional to the energy contained within the frequency range passed by the high pass filter. The summation is in effect a numerical integration.

The computed present energy level is then compared to the average energy level. If the present energy level is not greater by some amount of increase (e.g., 50%) than the average energy level over the previous time period of one second, a new average energy level is computed using the computed present energy level and the event detection routine continues with the energy level for the new present cycle being computed. If, however, the present energy level is greater, by the selected amount of increase, than the average level over the previous one second time period, an "event" is considered to have occurred. The event identification routine is then entered.

The criteria for event identification is the amount of time, either constantly or intermittently, that the high frequency components which triggered the "event" remain high in magnitude after the detection. Accordingly, the computer must count the number of cycles after an event detection in which the high frequency noise level remains at least the chosen percentage increase (e.g., 50%) greater than the pre-event average noise level. Thus, the first step in the event identification routine is the computation of the energy level for the present cycle. This computation is also a summation of sample points taken over an entire 60 Hz cycle. The computed present energy level is compared to the pre-event energy level average. If the energy level of the present cycle is greater than the pre-event average energy level by at least the chosen percentage increase (e.g., 50%), a counter is incremented. If the present energy level does not exceed the pre-event average by the chosen percentage increase (e.g., 50%), the count is not incremented.

After an event, the counting of cycles by the computer takes place over an arbitrary period of time, typically several seconds, which means over several cycles of 60 Hz. Accordingly, after each comparison of a present energy level against the pre-event average, the computer must check to see whether the time out of the selected time period is complete. If time out is not complete, the event identification routine goes back and re-executes the foregoing steps. If, however, the time out is complete, a comparison is made between the count by the computer and an arbitrary maximum count. Preferably, the maximum count represents the length of time in a long switching event plus a safety factor. Accordingly, if the count is greater than the selected maximum count, a fault is indicated. If, however, the maximum count is not exceeded by the count made by the computer, normal system operation is indicated and the event detection routine is again entered. Suitably, if more than 32 of 255 cycles after an event detection have an energy level 50% greater than the pre-event average energy level, a fault is present. A count of less than 30 cycles would indicate normal system operation.

C. Fault Detection System Implementation

In FIGS. 3-8, detailed schematic diagrams of circuitry for implementing the fault detection system diagrammed in FIG. 1 are presented.

Figure 3:
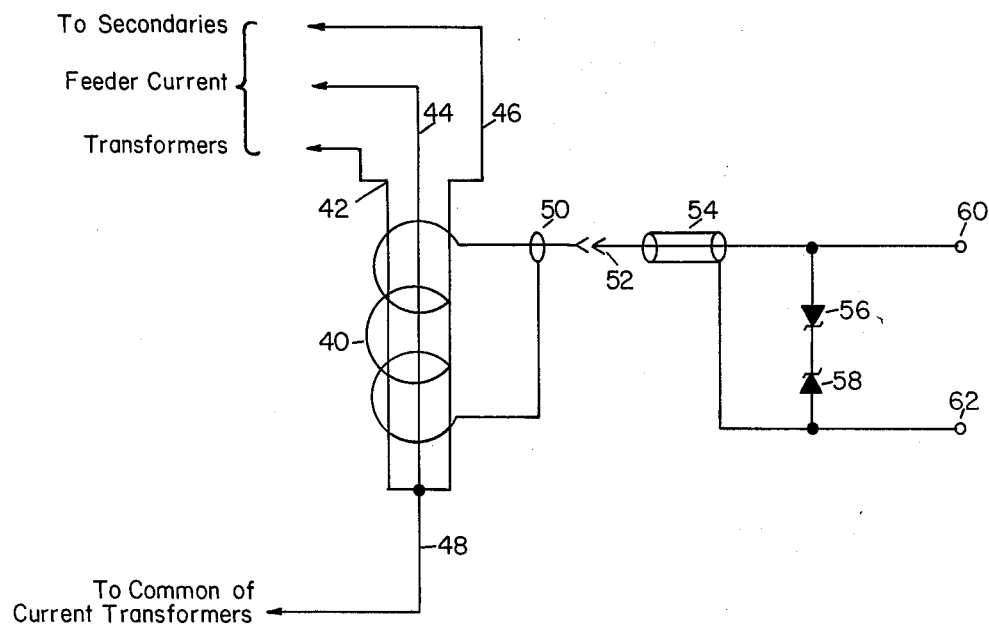
FIG. 3 is a schematic diagram of a current-to-voltage transducer for interfacing to the secondaries of feeder current transformers.

Referring first to FIG. 3, there is diagrammed one suitable means for interfacing the data acquisition portion of the fault detection system to the secondaries of current transformers on a feeder circuit. The interface includes a wideband current-to-voltage transducer 40. In a typical installation of the fault detection apparatus at a utility distribution substation, a transducer 40 will be used on each distribution feeder. Transducer 40 as indicated in FIG. 3, couples to conductors 42, 44 and 46 which lead to the secondaries of the feeder current transformers. As further indicated in FIG. 3, the feeder current transformers secondaries are connected together to a single conductor 48 which leads to a common terminal of the feeder current transformers. With the arrangement shown in FIG. 3, the transducer detects a summation of the currents in the feeder current transformers secondaries. When a fault occurs on any one of the phases, there is a change in the summation of currents, which is detected by a transducer 40.

Suitably, transducer 40 is a Pearson Model 411 transducer having a nominal output of 0.1 volt/ampere input, and a frequency response of 1 Hz to 35 MHz. Transducer 40 connects by mating portions 50, 52 of a BNC connector to a shielded cable 54 having zener diodes 56, 58 (ECG5 11 6) connected between terminals 60, 62. The current transducer 40 signal is made available between terminals 60 and 62 which connect to the high pass filter/amplifier portion of the apparatus.

Figure 4:
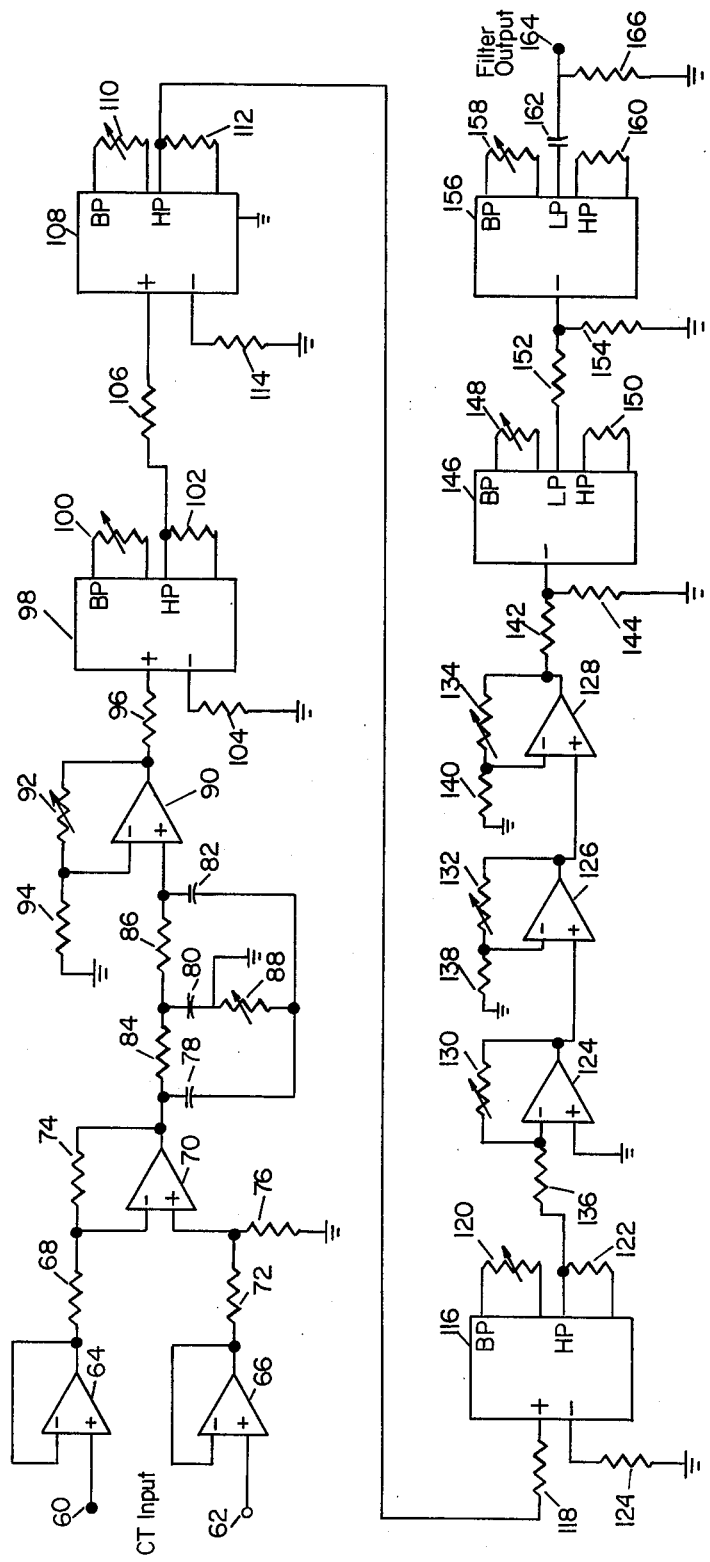
FIG. 4 is a schematic diagram of filter and signal conditioning circuitry to separate and amplify frequency bands of interest in the fault detection scheme.

Referring next to FIG. 4, terminals 60 and 62 are shown to be connected to the non-inverting input of two input buffer amplifiers 64, 66, each of which comprises an operational amplifier connected as a voltage follower. The output of buffer amplifier 64 is connected through resistor 68 to the inverting input of a differential amplifier, and the output of buffer amplifier 66 is connected by resistor 72 to the non-inverting input of differential amplifier 70. A feedback resistor 74 and a balancing resistor 76, both of equal value to resistors 68 and 72, are also included in the differential amplifier circuit.

The output of the differential amplifier is applied to a 60 Hz notch filter network comprising capacitors 78, 80 and 82; resistors 84 and 86; and variable resistor 88. This network removes substantially all of the 60 Hz signal components.

The remaining signal components after filtering are applied to the non-inverting input of amplifier 90 having variable feedback resistor 92 and resistor 94 connected to the inverting input. Amplifier 90 provides a gain of approximately 3 dB.

The output signal from amplifier 90 is applied via resistor 96 to a high pass filter comprising a universal active filter connected to provide a two-pole high pass Butterworth filter output function. Frequency tuning is accomplished by external resistors 100 and 102. The filter is used in a non-inverting input configuration; and accordingly, a resistor 104 is connected between the inverting input and ground.

The output signal from high pass filter 98 is coupled by resistor 106 to a second high pass filter 108 identical to filter 98. Similarly, the output signal from high pass filter 108 is coupled to a third high pass filter 116 by resistor 118. By cascading filters 98, 108 and 116, a six-pole Butterworth filter is realized.

The output signal from high pass filter 116 is applied to a three-stage amplification block comprising amplifier stages 124, 126 and 128. Each stage provides a gain of 20 dB, for a total of 60 dB of gain. The gain of each stage is individually adjustable by a variable feedback resistor 130, 132 and 134. The output signal from high pass filter 116 is applied to the first amplifier stage 124 by input resistor 136, which is connected to the inverting input of amplifier 124. The output signal of amplifier 124 is applied to the non-inverting input of amplifier 126; and similarly, the output of amplifier 126 is applied to the non-inverting input of amplifier 128. Amplifier stages 126 and 128 also include resistors 138 and 140, respectively.

The output of the third amplifier stage 128 is applied to a voltage divider network comprising resistors 142 and 144. The voltage across resistor 144 is applied to the inverting input of low pass filter circuit 146. Variable resistor 148 and fixed resistor 150 establish the 3 dB roll-off point at a frequency of 10 kHz. The output of filter 146 is applied to a second voltage divider network comprising resistors 152 and 154. The voltage across resistor 154 is applied to the inverting input of a second low pass filter 156 having resistors 158 and 160 to establish the frequency roll-point at 10 kHz.

The output of low pass filter 156 is coupled through capacitor 162 and applied to terminal 164, which has shunt resistor 166 connected thereto.

The circuitry diagrammed in FIG. 4 provides separation and amplification of the frequency bands of interest in the fault detection scheme of the present invention. In essence, frequencies above 2 kHz are of interest, since the lower-order harmonics of 60 Hz may vary significantly under differing load conditions and switching operations. However, signals in the vicinity of 10 kHz will be found to be approximately 60 dB down from the fundamental component. Accordingly, the filtering and amplification provided by the circuitry of FIG. 4 is required.

Figure 5:
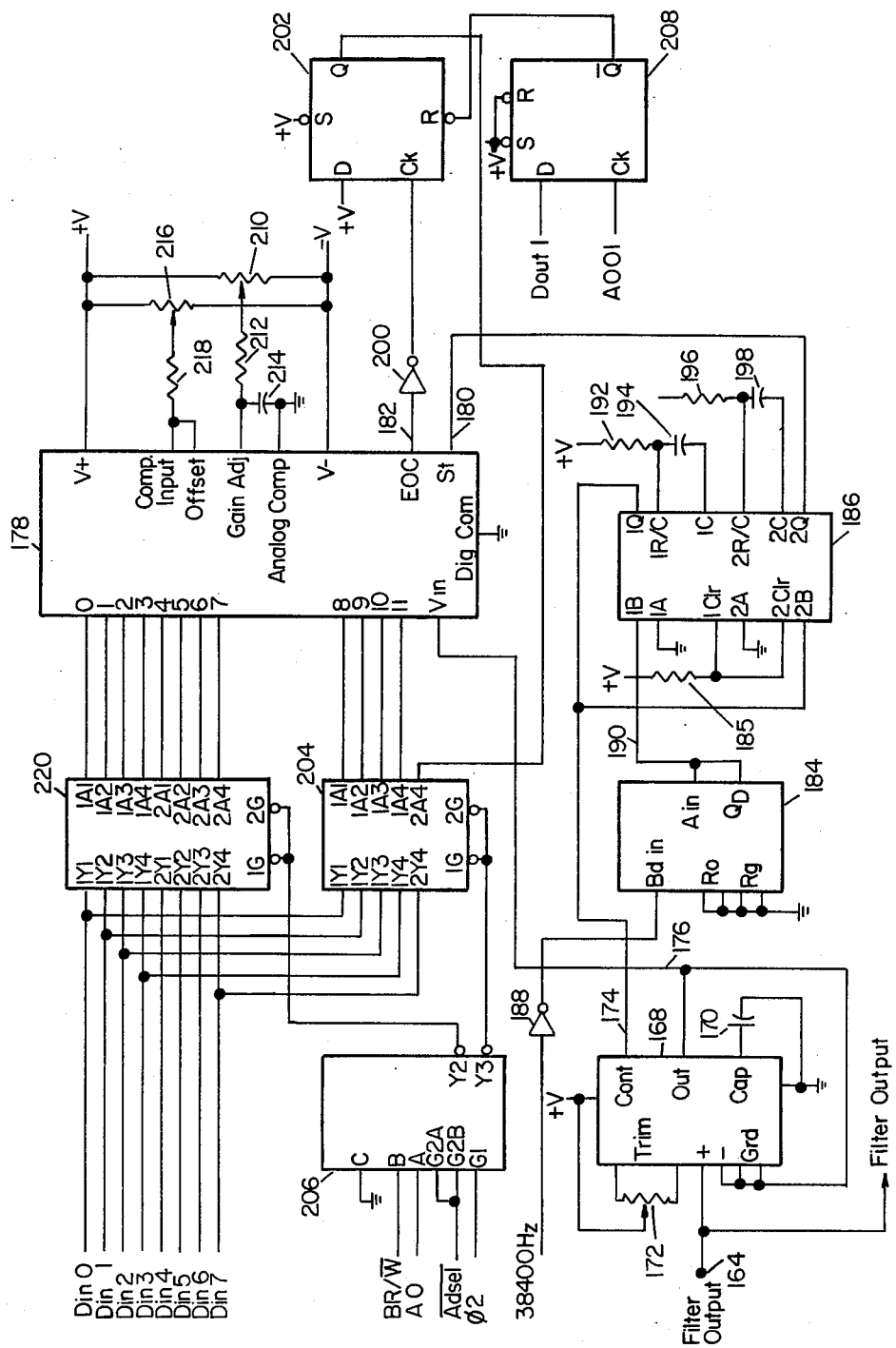
FIG. 5 is a schematic diagram of sample-and-hold and analog-to-digital converter circuitry to produce digital data for evaluation by the CPU in accordance with the fault detection scheme defined by the flowchart of FIG. 2.

The filter output signal at terminal 164 is applied to analog-to-digital converter circuitry shown in FIG. 5. The filter output signal is applied to an integrated sample-and-hold circuit 168 having an external holding capacitor 170 and an external offset trim potentiometer 172. Circuit 168 is arranged in a unity gain, non-inverting configuration. Circuit 168 has an internal electronic switch actuated by digital control input on line 174. The output of circuit 168 is available over line 176.

The output of sample-and-hold circuit 168 is applied to 12-bit analog-to-digital converter 178. Device 178 receives a conversion start signal on line 180, and provides a status output on line 182. After receiving a conversion start signal, the status line goes "high" and remains until conversion is completed and valid parallel data is available.

The conversion start signal is produced by circuitry including counter 184 and one-shot device 186. Clock pulses at a rate of 38,400 Hz are applied through inverter 188 to counter 184, which divides the clock by a factor of five to produce a 7,680 Hz squarewave on line 190. This divided-down clock is applied to one input of dual one-shot device 186. At the occurrence of each rising edge of the clock on conductor 190, the $Q_1$ output goes "high", and remains for a period of time determined by resistor 192 and capacitor 194. The output pulse width is approximately 800 nanoseconds wide. The output pulse from the $Q_1$ output is applied as the digital control signal to sample-and-hold circuit 168, to open the electronic switch therein.

The $Q_1$ output of one-shot 186 is also applied as an input to the other one-shot in device 186. Upon the occurrence of a pulse from the $Q_1$ output, the $Q_2$ output of device 186 goes "high" producing the conversion start signal. The $Q_2$ output remains high for a time duration determined by the values of resistor 196 and capacitor 198. Suitably, the $Q_2$ output pulse width is approximately 500 nanoseconds. When analog-to-digital converter 178 begins conversion, a status output signal on line 182 is applied to inverter 200. When the status output goes "low", indicating that valid data is available, inverter 200 clocks flip-flop 202 to set the Q output. The Q output of flip-flop 202 is applied as an input to line driver 204. Upon being enabled by decoder 206, line driver 204 applies the Q output to the bit 7 line of the data in buss. Under the direction of the microcomputer system, decoder 206 periodically enables line driver 204 to check for a change of state of flip-flop 202 which would indicate that valid data is available from the analog-to-digital converter. Flip-flop 202 is cleared by a signal produced by the $\overline{Q}$ output of flip-flop 208.

Analog-to-digital converter 178 is further provided with a gain adjustment and analog compensation using potentiometer 210 connected between $+V$ and $-V$, and a RC network comprising resistor 212 and capacitor 214. Offset adjustment in the internal comparator of the converter is provided by a bias voltage obtained from potentiometer 216 and resistor 218.

The 12 bits of data available from the analog-to-digital converter are applied to line drivers 204 and 220. Under control of decoder 206, the 12 bits of data are placed onto the DATA IN buss to the microcomputer system. Line driver 220 is enabled by the $Y_2$ output of decoder 206, and line driver 204 is enabled by the $Y_3$ output of decoder 206. Selection between the $Y_2$ and the $Y_3$ decoder outputs is determined by the input code applied to decoder 206, which code comprises the address bit A0 and the $\overline{BR/}$ (read-write) signal. The enable inputs of decoder 206 are controlled under the direction of the $\emptyset 2$ clock and the address select signal $\overline{ADSEL}$, which are also provided by the microcomputer system.

The microcomputer system to which the DATA IN buss connects includes a Pro-Log Corporation processor card and a Pro-Log Corporation 4K CMOS RAM memory board. Both the processor card and the RAM memory board are standard items available from Pro-Log Corporation. The processor card circuitry is shown in Pro-Log Corporation Schematic 8611/8611-1. The processor card is also identified as Assembly No. 101010 and Parts List No. 101716. The circuitry of the RAM memory board is shown in Pro-Log Corporation Schematic 8122, and is identified by the designations of Assembly No. 102661 and Parts List No. 102662.

The microcomputer system also includes read only memory (ROM) which stores the program of instructions to be followed by the central processing unit (CPU) in executing the fault detection scheme set forth in the flowchart of FIG. 2. The read only memory is diagrammed in FIG. 6 as ROM 222. An 11-bit address, A0-A10, from the CPU on the Pro-Log processor card addresses ROM 222. A chip select input $\overline{CS}$ is also required for reading code from ROM 222. Accordingly, chip select logic comprising NOR gates 224 and 226 is provided.

The signals $\overline{RDM}$ and $\overline{ROMSEL}$ are applied to NOR gate 224. When both signals are low, the output of NOR gate 224 is high. NOR gate 226, acting as an inverter, converts the high output of NOR gate 224 to a low input to ROM 222 to select the chip. The signal $\overline{RDM}$ is obtained from the Pro-Log processor board, and the signal $\overline{ROMSEL}$ is obtained from the card select logic on the Pro-Log RAM memory board.

ROM 222 is connectable to the DATA IN buss to the CPU through line driver 224. Accordingly, when ROM 222 is selected, line driver 224 must interconnect the ROM output to the DATA IN buss. This is accomplished by applying the output of NOR gate 224 as one input to NOR gate 230, the output of which provides a low input to the active-low output control inputs of the line driver.

Figure 8:
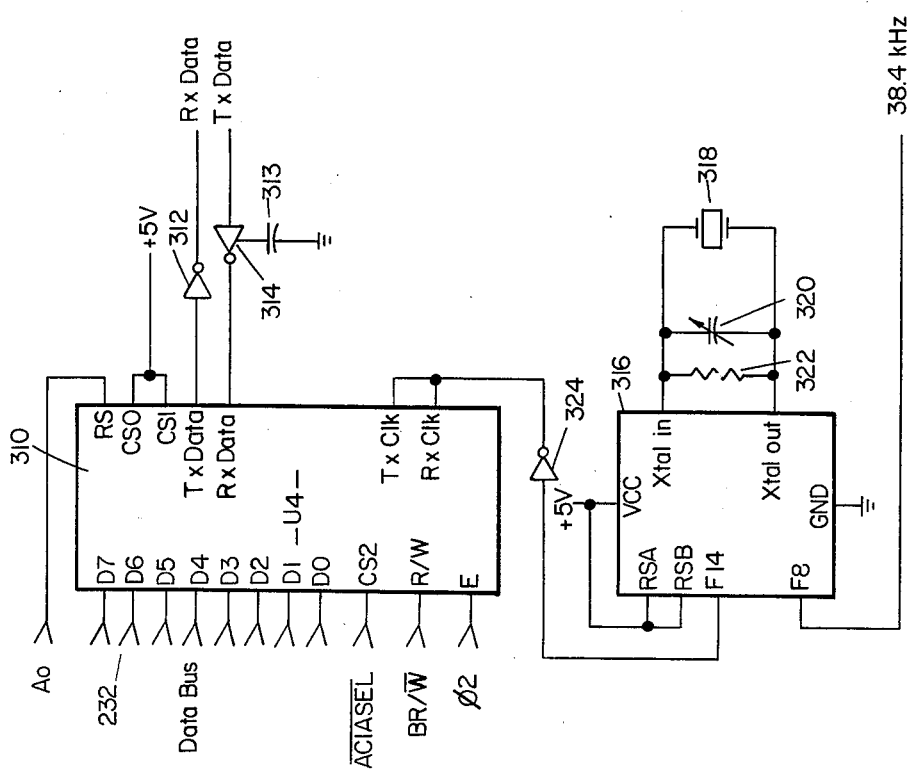
FIG. 8 is a schematic diagram of a serial interface for coupling the fault detection system to peripheral devices.

Data buss 232 which line driver 248 selectively couples to the DATA IN buss also leads to the serial interface diagrammed in FIG. 8. When incoming information through the serial interface is available, line driver 228 must be enabled to place the information on the DATA IN buss. Accordingly, NOR gate 230 must provide the enabling signal in this situation also. NOR gate 230 receives a second input from address logic comprising decoder 234 and NOR 236 which acts as an inverter. Decoder 234 receives on the select inputs the $\emptyset 2$ and the $\overline{BR/}$ signals from the processor card to select one of the data outputs. Additionally, decoder 234 receives an enable input signal $\overline{ACIASEL}$. Accordingly, when the serial interface is to be checked for incoming data, the signal $\overline{ACIASEL}$ enables decoder 234. When the signals $\emptyset 2$ and $\overline{BR/}$ are both high, the Y3 output goes low, which in turn causes gate 236 to provide a high input to NOR gate 230, enabling line driver 228.

As well as reading in off data buss 232, the CPU can output data over the DATA OUT buss to data buss 232 through line driver 238. Data for output onto data buss 232 may be data to be transmitted through the serial interface or data for indicating on the front panel status lights the status of the fault detection monitoring.

In order to enable line driver 238 for operation, a low output is obtained from NOR gate 240, which receives two inputs. The first input is from gate 242. When decoder 234 is enabled by the signal $\overline{ACIASEL}$ and the signals $\emptyset 2$ and $\overline{BR/}$ are high and low, respectively, the Y2 output of decoder 234 goes low. This in turn causes the output of gate 242 to go high; and NOR gate 240 enables line driver 238.

The second input to NOR gate 240 is from gate 244, a NOR gate connected in an inverter configuration. The input to gate 244 is from decoder 246. Address bits A0, A1, and A2 from the processor card are applied along with a signal $\overline{STATUSSEL}$ from the card select logic on the RAM memory board to decoder 246. When all inputs to decoder 246 are low, the Y0 output is selected and goes low. This causes gate 244 to apply a high input to NOR gate 240, in turn generating an enable signal to line driver 238.

Status data brought out onto data buss 232 through line driver 238 is applied to quad D-type flip-flop device 248. After data is set up at the inputs to device 248, it is latched in by a negative-going clock signal applied thereto. The clock signal is obtained from decoder 250. The inputs to decoder 250 are the $\emptyset 2$ and $\overline{BR/}$ signals from the processor card. Decoder 250 is enabled by the Y0 output of decoder 246. Accordingly, when status information is to be loaded into flip-flop device 248, decoder 246 which initiates enabling of line driver 238 also enables decoder 250. The signal $\overline{BR/}$ is taken low, such that on the occurrence of the $\emptyset 2$ clock signal, the Y2 output of decoder 250 will go low and clock device 248.

Status data loaded in flip-flop device 248 is made available from the $\overline{Q}$ outputs, each of which has an inverter 252, 254, 256, 258 connected thereto.

Inverter 252, based upon the four $\overline{Q}$ output of device 248 drives a status-like display circuit comprising light-emitting diode 260 and series resistor 262. Light-emitting diode 260 serves as an indicator of "normal" operation of the fault detection apparatus. Similarly, based upon the output of the three $\overline{Q}$ output of device 248, inverter 254 drives light-emitting diode 264 having resistor 266 in series therewith. Light-emitting diode 264 is a "fault" indicator. Inverter 256 drives light-emitting diode 268, which is connected in series with resistor 270, based upon the two $\overline{Q}$ output of device 248. Light-emitting diode 268 serves as the "event" indicator. Finally, inverter 258, depending upon the condition of the one $\overline{Q}$ output of device 248, drives light-emitting diode 272 having resistor 274 in series therewith. Light-emitting diode 272 provides a "run" indicator. The address logic diagrammed in FIG. 6 further includes logic for generating the address signals $\overline{A001}, \overline{A002},$ and $\overline{A003}$.

The signals are obtained as outputs from decoder 276. The A001 signal, as will be recalled, is applied as the clock to flip-flop 208 in FIG. 5, in clearing status of flip-flop 202. Signals A002 and A003 are used in the display driver circuitry shown in FIG. 7.

Decoder 276 is enabled by a low condition on the signal BR/. The input code to decoder 276 is obtained from the Y1, Y2, and Y3 outputs of decoder 246, which outputs are in turn, selected based upon address bits A0, A1, and A2 along with the signal STATUSSEL.

Figure 6:
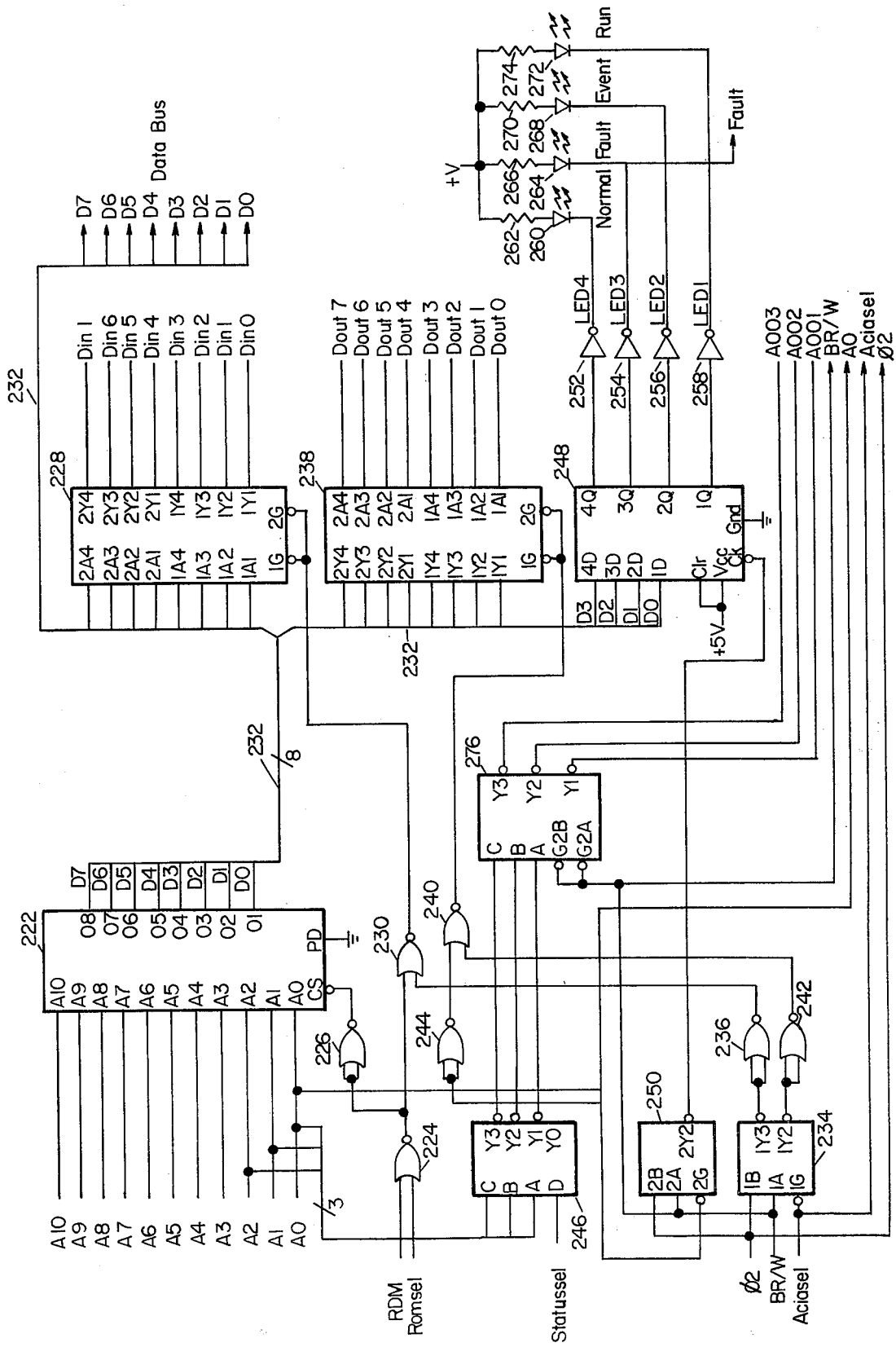
FIG. 6 is a schematic diagram of circuitry for the ROM shown in FIG. 1, status display latch/driver, and address logic for producing addressing signals used to select various portions of the circuitry.
Figure 7:
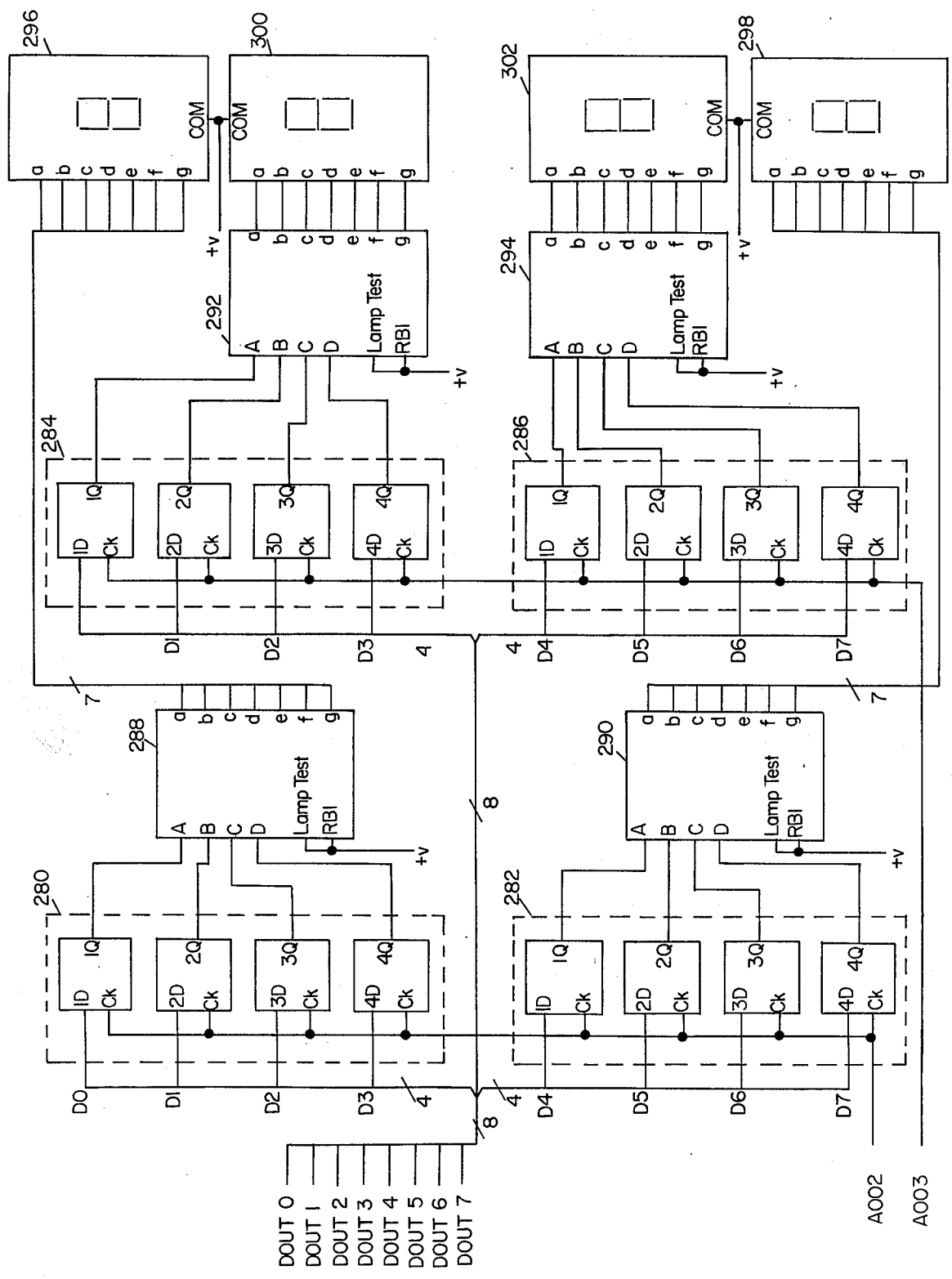
FIG. 7 is a schematic diagram of display driver circuitry and the events and faults displays.

The DATA OUT buss from the microcomputer system provides data for display to the display driver circuitry shown in FIG. 7. The 8 bits of display data are provided to quad D-type flip-flop devices 280 and 282. Display data on the DATA OUT buss is loaded into devices 280 and 282 by a clock signal A002 generated in FIG. 6.

The microcomputer system DATA OUT buss also provides display data to quad D-type flip-flop devices 284 and 286. These devices are clocked by A003, which is also generated in FIG. 6.

Display data loaded in flip-flop devices 280 and 282 is presented to BCD-to-seven-segment decoders/drivers 288 and 290. Similarly, the display data in devices 284 and 286 are applied to BCD-to-seven-segment decoder/drivers 292 and 294.

The output lines of decoder/driver device 288 are applied to 7-segment display 296, and the output lines from decoder/driver device 290 are applied to 7-segment display device 298. Display devices 296 and 298 constitute a 2-digit "events" display, with display 296 being the least significant digit. The events display displays the number of events on the feeder which have been detected since fault detection monitoring commenced.

The output lines from decoders/drivers 292 and 294 are applied to 7-segment display devices 300 and 302, respectively. These two display devices form the "faults" display. Display device 300 is the least significant digit of the display. The faults display indicates the number of faults on the feeder which have been detected since feeder monitoring commenced.

Referring now to FIG. 8, the serial interface for coupling the fault detection apparatus to peripheral apparatus, such as a data terminal or modem, is diagrammed. The serial interface comprises an asynchronous communications interface adapter 310 to allow data transfer over the 8-bit bi-directional data buss 232. The parallel data of data buss 232 is serially transmitted and received by the ACIA. Transmit data from the fault detection apparatus to be received as receive data by a peripheral instrument is sent by driver 312. Similarly, data transmitted from a peripheral device and applied to the ACIA as received data is passed through driver 314.

The ø2 clock from the processor card is applied as the enable signal to ACIA 310. The read/write input of the ACIA receives the BR/ signal from the processor card, and the signal ACIASEL is applied as a chip select input to the ACIA. Address bit A0 is applied to the register select line of the ACIA to select between the transmit and receive data registers.

The ACIA has separate inputs for clocking of transmitted and received data. As shown in FIG. 8, both clock inputs are tied together and provided with a single clock generated by bit rate generator 316. A crystal controlled oscillator is the clock source for the bit rate generator; accordingly, a crystal 318 and a tuning network comprising capacitor 320 and resistor 322 are also included. The clock signal for the ACIA is provided via inverter 324. Bit rate generator 316 also generates the 38.4 kHz clock used in the analog-to-digital converter circuitry shown in FIG. 5.

Figure 9:
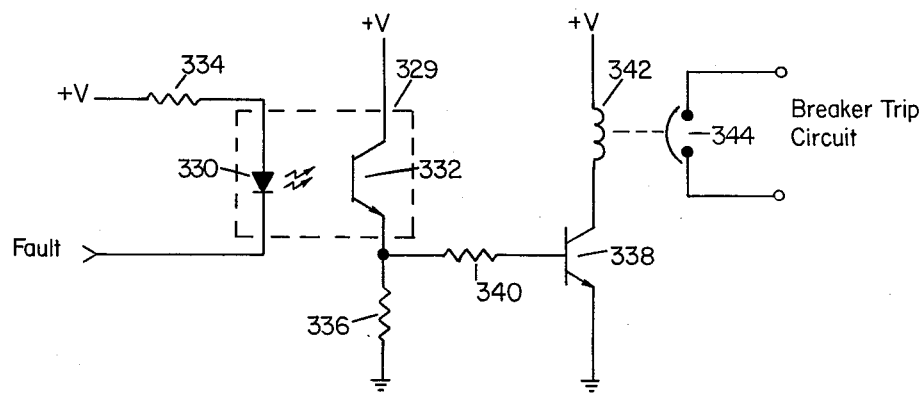
FIG. 9 is a schematic diagram of a circuit breaker trip circuit actuatable by the CPU to clear a feeder upon detection of a high impedance fault.

Referring to FIG. 9, there is diagrammed a circuit breaker interface for actuating a breaker trip circuit. The interface includes an opto-coupler device comprising light-emitting diode 330 and phototransistor 332. Light-emitting diode 330 is connected in series with current-limiting resistor 334. The cathode of light-emitting diode 330 is connected to inverter/driver 254 in FIG. 6. Phototransistor 332 is connected in a voltage follower configuration with emitter resistor 336. A driver transistor 338 is connected by resistor 340 to the emitter of phototransistor 332, so as to be turned-on when phototransistor 332 is turned-on. A relay coil 342 is connected to the collector of transistor 338 and serves to actuate relay contacts 334.

When the CPU determines that a fault condition exists, and enters the status into device 248 in FIG. 6, the FAULT signal generated by inverter 254 will go to a voltage level near ground. This will turn-on light-emitting diode 330, which will cause phototransistor 332 to be conductive, whereupon transistor 338 is turned on. Relay coil 342 is energized causing contacts 344 to be actuated. The breaker trip circuit then clears the fault by opening the feeder circuit.

D. Electronic Components

FIG. 4

| | |
|---|---|
| Operational amplifiers | |
| 64, 66, 70, 128 | LM 356 |
| Amplifier 90, filter 98 | Datel Systems, Inc. |
| Amplifier 126, filter 108 | Model FLT-U2 |
| Amplifier 124, filter 116 | |
| filter 146, filter 156 | |
| Resistors | |
| 68, 72, 74, 76, 94 | 2.2K |
| 84, 86 | 270K |
| 92, 130, 132, 134, 148, 158 | 10K |
| 96, 106, 118 | 10K |
| 104, 102, 114, 112, 124, 122 | 33K |
| 100, 110, 120 | 1K |
| 88 | 200K |
| 142, 152 | 470K |
| 144, 154 | 62K |
| 150, 160 | 51K |
| 166 | 100K |
| 136, 138, 140 | 1K |
| Capacitors 78, 80, 82, 162 | .01 µf |

FIG. 5

| | |
|---|---|
| Sample-and-hold circuit 168 | Datel Systems, Inc. Model SHM-IC-1 |
| Counter 184 | 74LS90 |
| One-shot 186 | 74LS123 |
| Decoder 206 | 74LS138 |
| Flip-flops 202, 208 | 74LS74 |
| Line drivers 204, 220 | 74LS240 |
| Inverter 188, 200 | 74LS04 |
| ADC 178 | Datel Systems, Inc. ADC-HX12BMC |
| Resistors | |
| 172, 210, 216 | 100K |
| 218 | 2.7M |
| 212 | 18M |
| 192 | 1K |
| 185, 196 | 10K |
| Capacitors | |
| 170, 214 | 0.1 µf |
| 194 | .0022 µf |
| 198 | 100 pf |

FIG. 6

| | |
|---|---|
| ROM 222 | TMS 2516 EPROM |
| Line drivers 228, 238 | 74LS240 |
| Decoders 234, 250 | 74LS139 |
| NOR gates | |
| 224, 226, 230, 236 | 74LS02 |
| 240, 242, 244 | |
| Decoder 246 | 74LS42 |
| Decoder 276 | 74LS138 |
| Quad D-type flip-flop 248 | 74LS175 |
| Inverters | |
| 252, 254, 256, 258 | 74LS07 |
| Resistors | |
| 262, 266, 270, 274 | 47 |

FIG. 7

| | |
|---|---|
| Quad D-type flip-flops | |
| 280, 282, 284, 286 | 74LS175 |
| BCD-to-seven segment decoder/drivers | |
| 288, 290, 292, 294 | 7447 |
| 7-segment displays | |
| 296, 298, 300, 302 | |

FIG. 8

| | |
|---|---|
| ACIA 310 | Motorola MC 6850 |
| Bit rate generator 316 | Motorola MC 14411 |
| Crystal 318 | 1.8432 MHz |
| Resistor 322 | 15M |
| Capacitor 320 | 10–35 pf trim |
| 313 | 300 pf |
| Inverter 324 | 74LS07 |
| Drivers 312, 314 | LM 1488 |

FIG. 9

| | |
|---|---|
| Resistors | |
| 334 | 47 ohms |
| 336 | 1K |
| 340 | 2.2k |
| Opto-coupler 329 | TIL-111 |
| Transistor 338 | 2N2985 |
| Relay 342, 344 | 30A, 12v single pole, normally open |

Appendix

```
JLIST
10 HIMEM: 8191: REM  END OF BASIC SPACE AT HEX 1FFF
20 REM  INTERFACE IN SLOT #2
30 REM  INSERT MACHINE LANGUAGE SUBROUTINES AT HEX 2010-206F
40 RESTORE
50 DATA 160,192,80,251,44,169,0,160,5,153,0,32,136,16,250,44,160,192,16,251,44,
       160,192,48,251,162,0,32,62,32,44,160,192,16,248,162,2,32,62
60 DATA 32,44,160,192,48,248,96,234,234,234,234,234,254,0,32,240,7,234,234,234,
       234,234,234,96,232,254,0,32,240,1,96,142,4,32,96,234,234,104,168
70 DATA 104,162,252,154,72,152,72,96,88,96,120,96,0,72,169,1,141,101,32,104,
       165,69,64,223
80 FOR N = 8203 TO 8304
90 READ H%: POKE N,H%
100 NEXT N
110 POKE 1022,102: POKE 1023,32: REM  CLOCK INTERRUPT
120 REM      MAIN PROGRAM
130 DIM QCAL(16),QZERO(16),A(8,5),TACH(16)
140 REM SET DEFAULT VALUES FOR QCAL QZERO AND TACH
150 DATA 19.98,19.80,19.81,19.69,19.78,19.75,20.00,19.74,238587,230637,245213,
       254384,238692,261420,225120,228259
```

```
160 FOR N = 1 TO 8
170 READ QCAL:QCAL(N) = QCAL:QZERO(N) = 6.00
180 NEXT
190 FOR N = 1 TO 8: READ TACH(N): NEXT
200 REM   KEYBOARD INPUT FOR TIME AND AFR SELECTION
210 HOME : PRINT " ENTER DATE AND TIME (E.G. 8/21/81-1638 WOULD BE 0821811638)"
220 INPUT BEG
230 ITVL = 60:MIN = 0:HRS = 0:TIME = 0
240 GOTO 1300
250 REM   MASTER MENU
260 HOME : VTAB 8: PRINT "-------- AFR MONITOR MENU ---------"
270 CALL 8279
280 PRINT : PRINT "    1) DISPLAY RPM"
290 PRINT "    2) ZERO TORQUE MONITORS"
300 PRINT "    3) MEASURE, DISPLAY, RECORD"
310 PRINT "       RPM, TORQUE, TEMP, TIME"
320 PRINT "    4) SET RECORDING INTERVAL"
330 PRINT "    5) WHICH AFRS OPERATING"
340 GOSUB 1070: IF Y = 155 THEN  GOTO 340
350 ON Y GOTO 380,470,670,960,1300,260,260,260
360 GOTO 340
370 REM DISPLAY RPM ONLY
380 HOME : VTAB 10: PRINT "WHICH AFR RPM DO YOU WANT DISPLAYED ?"
390 GOSUB 1070
400 IF ASELECT(AFR) = 0 THEN  GOTO 380
410 POKE 49663 + AFR,0
420 GOSUB 1180
430 RPM =  INT (TACH(AFR) / REV)
440 VTAB 13: PRINT "RPM FOR AFR #";AFR;" = ";: CALL  - 868: PRINT RPM
450 GOTO 390
460 REM   ZERO AFR'S
470 HOME : VTAB 10: PRINT "SET ZERO EXPERIMENTALLY (1) OR BY KEYBOARD INPUT (2)?"
480 AFR = 0: GOSUB 1070
490 IF AFR = 1 THEN  GOTO 520
500 IF AFR = 2 THEN  GOTO 630
510 GOTO 480
520 HOME : VTAB 10: PRINT "IF RPM HAS BEEN SET, WHICH AFR NEEDS ZEROING ?"
530 AFR = 0: GOSUB 1070
540 IF AFR = 0 OR ASELECT(AFR) = 0 THEN  GOTO 530
550 VTAB 6: PRINT "ZEROING AFR #";AFR
560 POKE 49663 + AFR,0
570 TOTR = 0
580 FOR N = 0 TO 19: GOSUB 1180
590 TOTR = TOTR + RTIO: NEXT
600 QZERO(AFR) = TOTR / 20 * QCAL(AFR)
610 VTAB 15: PRINT QZERO(AFR)
620 VTAB 6: CALL  - 868: PRINT "NEXT?": GOTO 530
630 HOME : VTAB 10: INPUT "ENTER 'AFR','ZERO' (ENTER '0' AFR TO EXIT)";V,QZERO(V)
640 IF V <  > 0 THEN  GOTO 630
650 GOSUB 1070
660 GOTO 650
670 REM    MONITOR PROGRAM
680 HOME
690 VTAB 3: PRINT "          ------AFR MONITOR------- ": PRINT
700 PRINT "           RUNTIME:"
710 PRINT : PRINT "AFR:";"RPM","TORQUE","FF"
720 FOR AFR = 1 TO 8
730 IF ASELECT(AFR) = 0 THEN  GOTO 920
740 POKE 49663 + AFR,0
```

```
2060-    60              RTS
2061-    58              CLI
2062-    60              RTS
2063-    78              SEI
2064-    60              RTS
2065-    00              BRK
2066-    48              PHA
2067-    A9 01           LDA    #$01
2069-    8D 65 20        STA    $2065
206C-    68              PLA
206D-    A5 45           LDA    $45
206F-    40              RTI
```

The foregoing description of the invention has been directed to a particular preferred embodiment for purposes of explanation and illustration. It will be apparent, however, to those skilled in this art that several modifications and changes may be made in the apparatus described without departing from the essence of the invention.

For example, although it is disclosed herein in connection with the foregoing description of a preferred embodiment that samples taken during a 60 Hz cycle are summed and an average over the entire cycle is used in the detection process, a sub-cycle analysis may be used instead. In a sub-cycle analysis, samples taken during a 60 Hz cycle are noted according to the portion of the cycle in which they occur as well as to their magnitude. This type of sampling can have importance in an arcing fault detection scheme since high frequency arcing predominates during certain portions of the 60 Hz cycle. In an implementation of this variation of the fault detection scheme described herein, energy levels can be computed over each octant or quadrant of the 60 Hz cycle. Evaluation is then made as to high frequency component energy levels existing during certain selected portions of each 60 Hz cycle.

It is the intention that the following claims cover all equivalent modifications and variations which fall within the scope of the invention.

What is claimed is:

1. Apparatus for detecting a high impedance fault on an electric power line having 60 Hz alternating current flowing therethrough, which comprises:
   a transducer coupled to the line, for providing a voltage signal indicative of the magnitude and waveform of current flowing in the line;
   a filter coupled to said transducer, for producing a signal output comprising the high frequency components of said transducer voltage signal;
   an amplifier coupled to said filter, for increasing the level of the filter output signal;
   a sample-and-hold circuit coupled to said amplifier, for taking samples of the amplifier output signal level during each cycle of the alternating power line current;
   an analog-to-digital converter coupled to said sample and-hold circuit, for converting each sample of the amplifier output signal to digital data representative thereof;
   a digital data buss;
   a microcomputer system, including interconnected central processing unit (CPU) and memory, said microcomputer system being coupled via the data buss to said analog-to-digital converter to receive digital data therefrom,
   said CPU performing computations using said digital data to detect the occurrence of an event on the power line based on a predetermined increase in level of the high frequency components of the alternating current flowing in the line,
   said CPU evaluating the time duration over which an event exists on the power line to determine the event to be a fault, and
   said CPU producing a fault indication output code on the data buss; and
   a circuit breaker interface connected to the data buss, said interface producing a circuit breaker trip signal in response to a fault indication output code on the data buss.

2. The apparatus of claim 1 wherein said transducer is a current-to-voltage transformer.

3. The apparatus of claim 1 further comprising a display interfaced to the data buss for receiving data from the CPU indicative of the number of events detected since a defined time start point, and providing a visual readout of the number of detected events.

4. The apparatus of claim 1 further comprising a display interfaced to the data buss for receiving data from the CPU indicative of the number of faults detected since a defined start point, and providing a visual readout of the number of detected faults.

5. The apparatus of claim 1 further comprising serial interface means for providing communication of data from the CPU to peripheral apparatus.

6. Apparatus for detecting high impedance faults on an electrical circuit having alternating current flowing therethrough, which comprises:
   means coupled to the electrical circuit for generating a signal indicative of the magnitude and waveform of the current in the circuit, and for removing from said generated signal the portion indicative of frequency components below a preselected frequency, so as to provide an output signal indicative of the high frequency components of the alternating current in the electrical circuit; and
   means receiving said output signal, for evaluating the same to determine whether the magnitude of the high frequency components of the alternating current in the electric circuit is above a prescribed level, and after determining that said components are above the prescribed level, for evaluating said output signal to further determine whether the magnitude of the high frequency components of the alternating current in the electric circuit remains above the prescribed level for at least a prescribed minimum number of cycles of the alternating current, thereby determining the existence of a

```
750  AVG = 0:STD = 0:RPM = 0:TEMP = 0
760  FOR N = 0 TO 9
770   GOSUB 1070
780   GOSUB 1180
790   IF PEEK (8293) = 1 THEN POKE 8293,0: GOSUB 990
800  RTIO = QCAL(AFR) * RTIO - QZERO(AFR)
810  AVG = AVG - RTIO
820  STD = STD + RTIO ^ 2
830  RPM = RPM + TACH(AFR) / REV
840   NEXT
850  STD = SQR (STD / 10 - AVG ^ 2 / 100):STD = INT (STD * 100 + .5) / 100
860  AVG = AVG / 10:AVG = INT (AVG * 100 + .5) / 100
870  RPM = INT (RPM / 10)
880   IF RPM = 0 THEN GOTO 900
890  FF = 36.90 * AVG / RPM ^ 2:FF = INT (FF * 1000 + .5) / 1000
900  A(AFR,0) = BEG:A(AFR,1) = HRS + MIN / 60:A(AFR,2) = RPM:A(AFR,3) =
      AVG:A(AFR,4) = STD:A(AFR,5) = FF
910   VTAB 8 + AFR: CALL - 868: PRINT AFR;":";RPM,AVG;"(";STD;")    ";FF
920   NEXT
930   CALL 8289
940   GOTO 720
950   REM  SET RECORDING INTERVAL
960   HOME : INPUT "WHAT RECORDING INTERVAL DO YOU WANT ( ENTER AS MINUTES )";ITVL
970   GOSUB 1070: GOTO 970
980   REM UPDATE TIME AND STORE DATA ON TAPE
990   CALL 8291: IF TIME = 0 THEN POKE 49241,0: STORE A: POKE 49240,0
1000 TIME = TIME + 1
1010  IF TIME > = ITVL THEN TIME = 0
1020  VTAB 5: HTAB 20: CALL - 868: PRINT HRS;":";MIN
1030 MIN = MIN + 1
1040  IF MIN = 60 THEN MIN = 0:HRS = HRS + 1
1050  CALL 8289
1060  RETURN
1070  REM  AFR KEYBOARD PROCESSOR
1080  VTAB 21: PRINT "TO EXIT PRESS 'ESC' KEY"
1090 Y = PEEK (49152): POKE 49168,0
1100  IF Y < 128 THEN RETURN
1110  IF Y = 155 THEN GOSUB 1170: GOTO 260
1120 Y = Y - 176
1130  FOR N = 1 TO 8
1140  IF Y = N THEN GOSUB 1170:AFR = N: RETURN
1150  NEXT
1160  VTAB 20: PRINT "WRONG KEY - TRY AGAIN!": GOTO 1090
1170  VTAB 20: CALL - 868: RETURN
1180  REM   MACHINE LANGUAGE SUBROUTINE INTERFACE
1190  CALL 8208
1200 SLOT = PEEK (8193) * 256 + PEEK (8192)
1210 MASK = PEEK (8195) * 256 + PEEK (8194)
1220 REV = SLOT + MASK:RTIO = SLOT / REV
1230 OVRANGE = PEEK (8196)
1240  RETURN
1250  GOSUB 1070
1260  PRINT Y,AFR: GOTO 1250
1270  CALL 8279
1280  PRINT N
1290  GOTO 1250
1300  REM  SELECT AFRS TO RUN
1310  HOME : PRINT "AFR SELECTION": PRINT : PRINT
1320  FOR N = 1 TO 8
```

```
1330 VTAB 10: PRINT "AFR #";N;" (Y/N)";
1340 INPUT A$
1350 ASELECT(N) = 0: IF A$ = "Y" THEN ASELECT(N) = 1
1360 NEXT
1370 GOTO 260
```

Machine Language Subroutines

```
2010- A9 00 A0 05 99 00 20 88
*2010LLL

2010-   A9 00       LDA     #$00
2012-   A0 05       LDY     #$05
2014-   99 00 20    STA     $2000,Y
2017-   88          DEY
2018-   10 FA       BPL     $2014
201A-   2C A0 C0    BIT     $C0A0
201D-   10 FB       BPL     $201A
201F-   2C A0 C0    BIT     $C0A0
2022-   30 FB       BMI     $201F
2024-   A2 00       LDX     #$00
2026-   20 3E 20    JSR     $203E
2029-   2C A0 C0    BIT     $C0A0
202C-   10 F8       BPL     $2026
202E-   A2 02       LDX     #$02
2030-   20 3E 20    JSR     $203E
2033-   2C A0 C0    BIT     $C0A0
2036-   30 FB       BMI     $2030
2038-   60          RTS
2039-   EA          NOP
203A-   EA          NOP
203B-   EA          NOP
203C-   EA          NOP
203D-   EA          NOP
203E-   FE 00 20    INC     $2000,X
2041-   F0 07       BEQ     $204A
2043-   EA          NOP
2044-   EA          NOP
2045-   EA          NOP
2046-   EA          NOP
2047-   EA          NOP
2048-   EA          NOP
2049-   60          RTS
204A-   E8          INX
204B-   FE 00 20    INC     $2000,X
204E-   F0 01       BEQ     $2051
2050-   60          RTS
2051-   8E 04 20    STX     $2004
2054-   60          RTS
2055-   EA          NOP
2056-   EA          NOP
2057-   68          PLA
2058-   A8          TAY
2059-   68          PLA
205A-   A2 FC       LDX     #$FC
205C-   9A          TXS
205D-   48          PHA
205E-   98          TYA
205F-   48          PHA
``` high impedance fault condition on the electrical circuit.

7. The apparatus of claim 6 wherein said output signals generating means generates multiple bit digital code signals, and wherein said evaluating means comprises a microcomputer operating in accordance with a set of program instructions.

8. The apparatus of claim 6 wherein said output signals generating means includes means for generating a voltage signal representative of the magnitude and waveform of the alternating current in the electrical circuit; a high pass filter for substantially removing from said voltage signal frequency components below a defined frequency; means for sampling filtered voltage signals at a plurality of points within each cycle of the alternating current and an analog-to-digital converter for producing multiple bit digital code signals representative of each voltage signal sample.

9. The apparatus of claim 6 or 8 wherein said output signals evaluating means comprises a microcomputer including a central processing unit, random access memory, and read-only memory.

10. The apparatus of claim 9 wherein a set of program instructions is stored in said read-only memory for causing said central processing unit to evaluate said output signals to determine a fault, by: computing an energy level for a present cycle of the alternating current in the electrical circuit; comparing the computed energy level to an average energy level; and if the computed energy level for the present cycle exceeds the average energy level by a predetermined amount, counting the number of cycles within a prescribed time interval that the computed energy level exceeds by the predetermined amount the average energy level.

11. The apparatus of claim 9 wherein a set of program instructions are stored in said read-only memory for causing said central processing unit to evaluate said output signals to determine a fault by executing an event detection routine which involves computing an energy level for a present cycle of the alternating current in the electrical circuit; comparing the present cycle energy level to an average energy level of the alternating current over a preceding time interval; if the comparison finds that the present cycle energy level is at least 30% greater than the average energy level, an event detection is indicated and an event identification routine is entered; if the comparison finds that the present cycle energy level is less than 50% greater than the average energy level, a new average energy level is computed using the present cycle energy level and the event detection routine is again entered; and by executing an event identification routine which involves computing the energy level for a present cycle of the alternating current in the electrical circuit; comparing the energy level of the present cycle to the average energy level of the alternating current prior to an event detection; if the comparison finds that the present cycle energy level is at least 50% greater than the average energy level, incrementing a count of cycles having an energy level at least 30% greater than the average energy level; if the comparison finds that the present cycle energy level is less than 30% greater than the average energy level, leaving the cycles count at the present value; after a defined time period, comparing the cycles count to a preselected maximum count indicative of a fault condition on the electrical circuit; if the count is equal to or greater than the maximum count, outputting a fault indication from the central processing unit; and if the count is less than the maximum count, entering the event detection routine.

12. Apparatus for detecting a high impedance fault on an electrical circuit having alternating current flowing therethrough, and having a circuit breaker for disconnecting the circuit from a source of electrical power, which comprises:

a transducer coupled to the electrical circuit for providing a voltage signal indicative of the magnitude and waveform of the current in the circuit;

a filter coupled to the transducer, for substantially removing from the voltage signal frequency components below a preselected frequency;

means for sampling the filtered voltage signal a plurality of times during a cycle of the alternating current, and converting each voltage sample to a digital data word representative of the voltage sample;

a microcomputer system, including interconnected central processing unit (CPU) and memory means, coupled to said sampling and converting means, said memory storing a fault detection program routine comprising an instruction set for instructing predetermined computation processing by the central processing unit using the voltage samples digital data, to determine whether the magnitude of the high frequency components in a cycle of the alternating current in the electric circuit is at least a prescribed level, and after determining that said components are above the prescribed level, to further determine whether the magnitude of the high frequency components of the alternating current in the electric circuit remains at least the prescribed level for at least a prescribed minimum number of cycles during a prescribed time interval, thereby determining a fault condition on the electrical circuit; and means coupled to the central processing unit and actuated thereby upon a determination of a fault condition on the electrical circuit, for actuating the circuit breaker to disconnect the electrical circuit.

13. The apparatus of claim 12 wherein said filter removes from the voltage signal frequency components below 2 kHz.

14. The apparatus of claims 12 or 13 wherein the prescribed level is 50% greater than the average magnitude of the high frequency components over a prescribed time interval.

15. The apparatus of claim 12 wherein the prescribed minimum number of cycles is 32, and the prescribed time interval equals the duration of 255 cycles of a 60 Hz signal.

16. A method of detecting high impedance faults in an electrical circuit having alternating current flowing therein, comprising the steps of:

(a) producing a signal representative of the magnitude and waveform of the alternating current;

(b) filtering the signal to substantially remove frequency components below a prescribed frequency;

(c) sampling the amplitude of the filtered signal a plurality of time during a present cycle of the alternating current;

(d) computing the energy level of the filtered signal during a present cycle based on the samples taken during the cycle;

(e) comparing the computed energy level of the present cycle to an average of the computed energy levels over a preceding time interval spanning a plurality of preceding cycles of the alternating current;

(f) if the computed energy level of the present cycle is at least a prescribed amount greater than the average energy level, computing the energy level of the filtered signal during each of a predetermined number of the successive following cycles of the alternating current;

(g) comparing the computed energy level of each cycle to said computed energy level average;

(h) counting the number of cycles wherein the computed energy level exceeded said computed energy level average;

(i) comparing said count of cycles to a predetermined count value; and (j) producing a fault indication if said count of cycles equals or exceeds the predetermined count value.

17. A method of detecting high impedance faults in an electrical circuit having electrical current flowing therein, comprising the steps of:

generating a signal indicative of the magnitude and waveform of the current in the circuit;

removing from said generated signal the portion indicative of frequency components below a preselected frequency, so as to provide a signal indicative of the high frequency components of the current in the circuit;

monitoring the high frequency components of the electrical current to measure the energy level thereof;

detecting an increase in high frequency component energy level above an average energy level existing over a preceding prescribed time interval; and determining the existence of an increased high frequency components energy level over a prescribed period of time, thereby determining the existance of a high impedance fault condition on the electrical circuit.

18. Apparatus for detecting high impedance faults on an electrical circuit having electrical current flowing therethrough, which comprises:

means coupled to the electrical circuit for generating a signal indicative of the magnitude and waveform of the current in the circuit, and for removing from said generated signal the portion indicative of frequency components below a preselected frequency, so as to provide an output signal indicative of the high frequency components of the alternating current in the electrical circuit; and means receiving said output signal, for evaluating the same to determine whether the magnitude of the high frequency components is above a prescribed level, and after determining that said components are above the prescribed level, for evaluating said output signal to further determine whether the magnitude of the high frequency components of the electrical current in the electric circuit remains above the prescribed level for at least a prescribed minimum period of time, thereby determining the existence of a high impedance fault condition on the electrical circuit.

* * * * *